W. ROSENBLATT AND J. J. SIMON.
WINDSHIELD FOR VEHICLES.
APPLICATION FILED APR. 3, 1920.
1,397,234.
Patented Nov. 15, 1921.
2 SHEETS—SHEET 1.
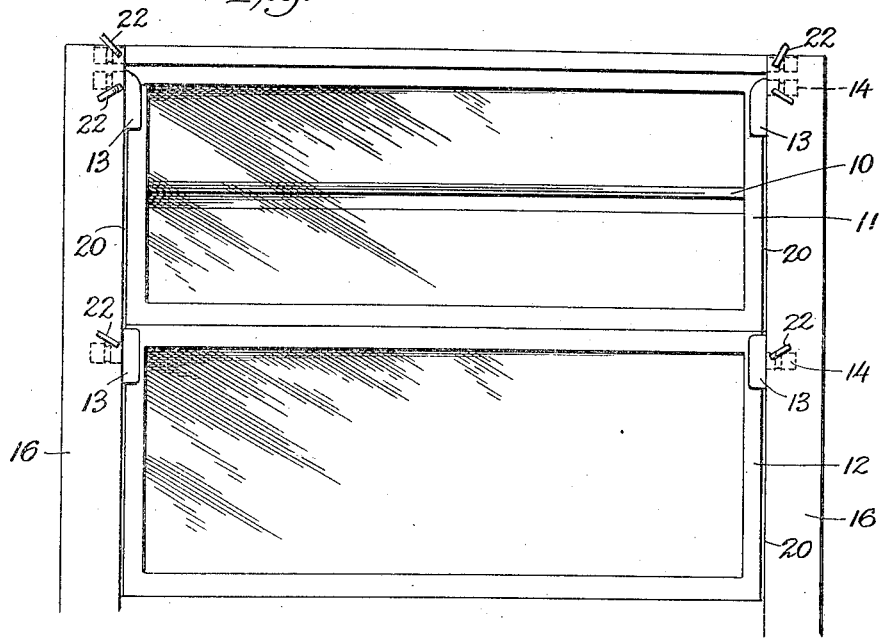
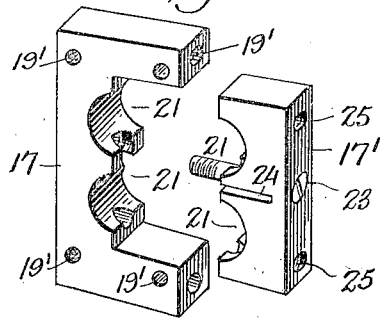
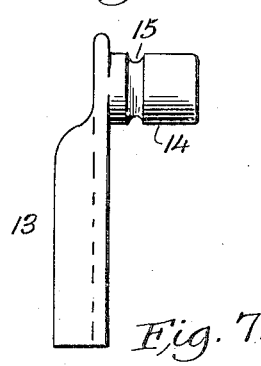
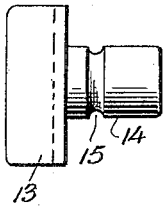
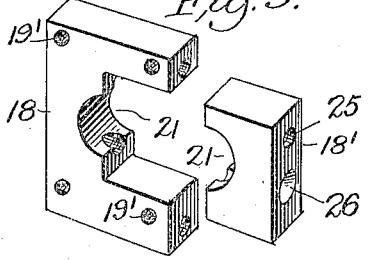
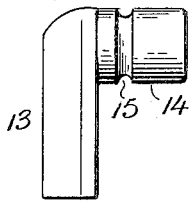
INVENTORS,
William Rosenblatt,
Jacob J. Simon,
BY
James P. Duhamel,
ATTORNEY.

W. ROSENBLATT AND J. J. SIMON.
WINDSHIELD FOR VEHICLES.
APPLICATION FILED APR. 3, 1920.
1,397,234.
Patented Nov. 15, 1921.
2 SHEETS—SHEET 2.
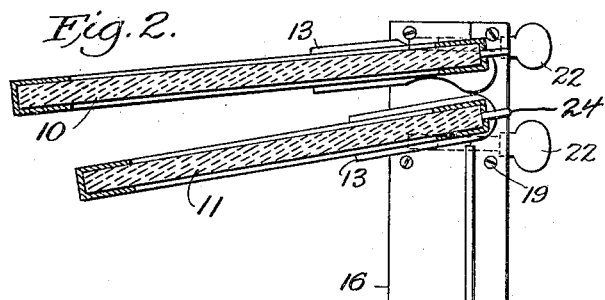
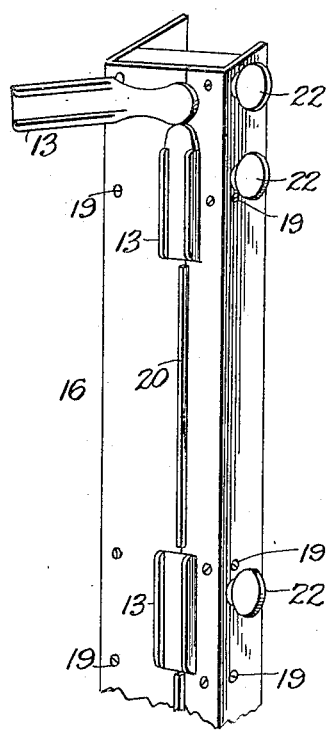
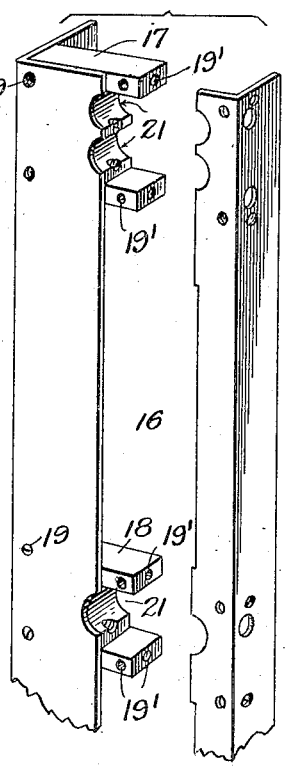
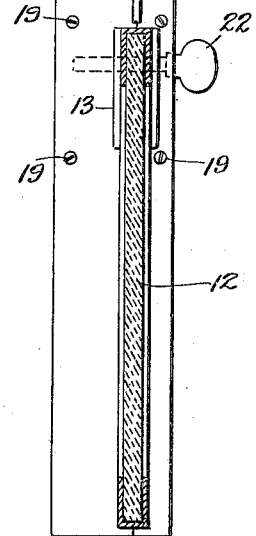
INVENTOR,
William Rosenblatt,
Jacob J. Simon,
BY
James P. Duhamel,
ATTORNEY

UNITED STATES PATENT OFFICE.

WILLIAM ROSENBLATT AND JACOB J. SIMON, OF BROOKLYN, NEW YORK.

WINDSHIELD FOR VEHICLES.

1,397,234.     Specification of Letters Patent.     Patented Nov. 15, 1921.

Application filed April 3, 1920. Serial No. 371,117.

*To all whom it may concern:*

Be it known that we, WILLIAM ROSENBLATT and JACOB J. SIMON, citizens of the United States, and residing at Brooklyn, Kings county, New York State, have invented certain new and useful Improvements in Windshields for Vehicles, of which the following is a specification.

This invention relates to wind shields for vehicles and more particularly to that class of shields comprising three sections of glass, two of which form the transparent walls of a window while the third section is designed to form a protector from rain and mist for one of the sections and the object of the invention is to provide means for hinging and pivoting the said sections so that they may be swung to any angle and conveniently assembled, as will be more clearly described in the following specification, set forth in the appended claims and illustrated in the accompanying drawings, wherein:

Figure 1 is a view showing the shield in position from the inside of a vehicle car.

Fig. 2 is a vertical sectional view through an end of the shield.

Fig. 3 is a perspective view of the channel bar at its upper end.

Fig. 4 is a perspective view of the upper bearing block.

Fig. 5 is a similar view of the lower bearing block.

Figs. 6, 7 and 8 are side views of the sockets and trunnions.

Fig. 9 shows one of the channel bars separated.

The three sections 10, 11 and 12 of the shield are of glass with frames around them and secured at their upper ends in sockets 13, the latter having trunnions 14, on their inner faces with annular grooves 15.

The frame of the window in which the shield fits comprises channel bars 16 made of two pieces that are held together by bearing blocks 17 and 18 and screws 19 passing through the bars and into the blocks and as the two pieces are fitted together they inclose strips 20 of rubber or flexible material that engages the edges of the frames and make the shield air tight at the sides.

To receive the trunnions 14, appropriate openings are made in the channel bar so they may enter the bearing sockets 21 of the bearing blocks and, as will be seen, the latter are provided with holes $19^1$ for the screws 19. The blocks are made in two parts, each having an auxiliary section $17^1$ and $18^1$ with sockets to embrace the trunnions and they are secured to the blocks themselves by means of a screw 23 and the section $17^1$ has the slot 24 at its middle so as to be susceptible to pressure at its ends and compress the trunnions 14 as desired. The blocks and their sections have holes 25 for the thumb screws 22 and holes 26 for the screws 23.

The auxiliary sections not only assist in solidifying the blocks but they are also adapted to exert a pressure on the trunnions and create enough friction to retain the sockets and the frames at various angles. The screws 22 and 23 in passing through the blocks and sections, cross the trunnions tangentially and into the grooves 15, permitting the free movement of the trunnions axially but preventing their longitudinal release.

It will be observed that when the device is assembled the screw 23 is hidden within the smaller section of the channel bar and to adjust the same the section must be removed but the adjustment is maintained by the close proximity of the block and the flange of the channel bar.

When the screws 22, are adjusted an opening of sufficient size is provided in the channel bar to permit them to bear directly on the auxiliary block and the resiliency of the latter, allows the auxiliary to rock and apply the appropriate pressure to the trunnion.

In order to completely close any space between the frames 10 and 11, appropriate weather strips 24, may be secured to their upper edges as shown in Fig. 2.

While the construction provides for a substantial and simple arrangement of a wind shield, it is obvious that the parts may be otherwise arranged and modified without departing from the essential features above described or from the scope of the appended claims.

What I claim is:—

1. In a wind shield, the combination of sash frames, trunnions on the same, packing strips, channel bars divided longitudinally and having adjacent recesses for the trunnions and for the packing strips, bearing blocks for the trunnions adapted to unite the channel bars, and means for adjusting the pressure of the blocks on the trunnions.

2. In a wind shield, the combination of glass carrying frames having trunnions, packing strips for the edges of the frames, vertically divided channel bars adapted to be located at each side of the frames and having recesses for the passage of the trunnions and openings to contain and grip the packing strips, bearing blocks adapted to be located within the channel bars, and means adapted to retain the trunnions in the bearing blocks and to exert a pressure thereon.

3. In a wind shield, the combination of frames having trunnions with annular grooves, channel bars made of vertical sections, blocks with bearings for the trunnions and adapted to unite the sections of the channel bars, and screws passing tangentially through the trunnions and adapted to compress the blocks to clamp said trunnions.

4. In a wind shield, the combination of frames having lateral pivot trunnions, channel bars comprising the sides of an opening, and carrying the pivot trunnions, bearing blocks within the channel bars and divided into sections, a screw tangential to the trunnions holding the sections together, and screws to compress the sections and clamp the pivot trunnions.

5. In a wind shield, the combination of frames, having trunnions with an annular groove sectional side bars for the frames, bearings for the trunnions within the side bars and having clamping means, and screws adapted to play in the grooves tangentially and operate the clamping means.

6. In a wind shield, the combination of frames having trunnions with annular grooves, packing strips, channel bars composed of two sections and having recesses for the trunnions and the packing strips along their adjacent edges, blocks with bearings for the trunnions and adapted to unite the sections of the channel bars, a flexible section to the block and bearing on the trunnions, and screws passing tangentially through the trunnions and the two sections of the blocks and adapted to clamp the trunnions in the latter.

7. In a wind shield, the combination of window frames, trunnions at the sides of same and having annular grooves, channel bars of two pieces and having openings, bearing blocks within the channel bars and adapted to secure the two pieces together, a clamping section to the bearing blocks, a flexible screw adapted to secure each section coöperating with its block, screws passing through the sections and tangentially through the grooves and adapted to compress the former and retain the latter, and packing about the frames.

8. In a wind shield, the combination of frames and glass adapted to cover an opening, a third frame and glass adapted to be swung before the upper frame and glass, grooved trunnions at the sides of the frames, a two-piece channel bar, having openings for the trunnions, bearing blocks for the trunnions and holding the bar pieces together, and individual clamping and retaining screws playing in the blocks for each frame.

In testimony whereof, we have signed our names to this specification, in the presence of two subscribing witnesses, this 25 day of March, 1920.

WILLIAM ROSENBLATT,
JACOB J. SIMON.

Witnesses:
A. W. BAKER,
JAMES F. DUHAMEL.